(12) United States Patent
Gitz et al.

(10) Patent No.: US 10,235,774 B1
(45) Date of Patent: Mar. 19, 2019

(54) METHOD AND SYSTEM FOR CALIBRATION OF AN IMAGE CAPTURING DEVICE MOUNTED ON A MACHINE

(71) Applicant: Caterpillar Inc., Peoria, IL (US)

(72) Inventors: David Paul Gitz, Peoria, IL (US); Paul Russell Friend, Morton, IL (US); Maikel Orlando Torres Pineiro, Peoria, IL (US); Qi Chen, Canton, MI (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/812,428

(22) Filed: Nov. 14, 2017

(51) Int. Cl.
| | |
|---|---|
| G06T 7/00 | (2017.01) |
| G06T 7/80 | (2017.01) |
| H04N 17/00 | (2006.01) |
| G01S 19/51 | (2010.01) |
| H04N 5/232 | (2006.01) |
| G06F 3/0488 | (2013.01) |
| G06T 11/60 | (2006.01) |
| H04N 7/18 | (2006.01) |

(52) U.S. Cl.
CPC ............... *G06T 7/80* (2017.01); *G01S 19/51* (2013.01); *G06F 3/04883* (2013.01); *G06T 11/60* (2013.01); *H04N 5/23296* (2013.01); *H04N 7/18* (2013.01); *H04N 17/002* (2013.01)

(58) Field of Classification Search
CPC .... H04N 5/23296; H04N 17/002; G06T 7/80; G06T 11/60; G06T 7/00; G06T 19/00; G06T 3/60; G06T 15/10; G06F 3/04883

USPC .................................. 345/633, 646; 348/187
See application file for complete search history.

(56) References Cited

U.S. PATENT DOCUMENTS

| | | | |
|---|---|---|---|
| 7,035,760 | B2 | 4/2006 | Kobayashi et al. |
| 7,542,051 | B2 | 6/2009 | Matsui et al. |
| 8,542,250 | B2 | 9/2013 | Baseley et al. |
| 9,264,702 | B2 | 2/2016 | Liu et al. |
| 9,508,146 | B2 | 11/2016 | Davies et al. |
| 9,542,745 | B2 | 1/2017 | Moteki et al. |
| 2002/0105484 | A1 | 8/2002 | Navab et al. |
| 2015/0193980 | A1 | 7/2015 | Pedley et al. |

(Continued)

FOREIGN PATENT DOCUMENTS

WO     2014103683     7/2014

*Primary Examiner* — Trang U Tran
(74) *Attorney, Agent, or Firm* — Harrity & Harrity LLP

(57) ABSTRACT

A method for calibrating an image capturing device mounted on a machine is provided. The image capturing device is configured to capture one or more images of a calibration target. The one or more images include a set of reference points corresponding to the calibration target. The method includes receiving a first positional data and a second positional data associated with the image capturing device and the calibration target respectively. The method includes generating, through the processor, a set of augmented reality points based on the first positional data and the second positional data. The method further includes overlaying, through the processor, the set of augmented reality points on the set of reference points displayed on the display. The method includes iteratively adjusting, through the processor, at least one of a roll, a yaw, or a pitch of the image capturing device until the set of augmented reality points align with the corresponding set of reference points.

20 Claims, 9 Drawing Sheets

(56) References Cited

U.S. PATENT DOCUMENTS

| | | | |
|---|---|---|---|
| 2016/0170603 A1* | 6/2016 | Bastien | G06T 7/80 348/49 |
| 2017/0011555 A1 | 1/2017 | Li et al. | |
| 2017/0154471 A1 | 6/2017 | Woo et al. | |

* cited by examiner

METHOD AND SYSTEM FOR CALIBRATION OF AN IMAGE CAPTURING DEVICE MOUNTED ON A MACHINE

TECHNICAL FIELD

The present disclosure relates to image capturing devices mounted on machines. More specifically, the present disclosure relates to calibration of an image capturing device mounted on a machine.

BACKGROUND

In recent years, use of cameras mounted on the vehicles has tremendously increased. These cameras are typically coupled to a display to assist drivers while the vehicle is being parked, and/or to observe an environment of the vehicle while the vehicle is in motion. Augmented reality (AR) techniques may also be used to overlay AR information on the camera feed to assist drivers. If the camera is not calibrated with sufficient accuracy, the AR information displayed may not appear to correlate with real object(s) seen in the camera feed, and instead it may be at an offset to the real object(s) and/or floating around in space. In order to properly overlay the information and to make maximum usage of the camera mounted on the vehicle, calibration of the camera may be performed. The calibration typically includes determining the position and orientation of the camera.

Usually, such camera-based systems may be calibrated at the end of a production line during the manufacture of the vehicle by using external markings on the ground. Such approach, however, may involve placement of the vehicle very accurately relative to the external markers during calibration. Additionally, the calibration may need to be repeated frequently over time thus making the overall calibration process cumbersome.

For some applications, the absolute position and orientation may be required to be referenced to satellite-based positioning systems. For other applications, the relative position and orientation may be required to be referenced to the ground. It can be difficult to perform the camera calibration accurately. This is an increased challenge when performing installations, maintenance, or adjustments in the worksite.

Given description covers one or more above mentioned problems and discloses a method and a system to solve the problems.

SUMMARY

In an aspect of the present disclosure, a method for calibrating an image capturing device mounted on a machine is provided. The image capturing device is configured to capture one or more images of a calibration target. The image capturing device is communicably coupled to a display configured to display the one or more images, wherein the one or more images include a set of reference points corresponding to the calibration target. The method includes receiving a first positional data associated with the image capturing device and receiving a second positional data associated with the calibration target. The method includes generating, through the processor, a set of augmented reality points based on the first positional data and the second positional data. The method further includes overlaying, through the processor, the set of augmented reality points on the set of reference points displayed on the display. The method includes iteratively adjusting, through the processor, at least one of a roll, a yaw, or a pitch of the image capturing device until the set of augmented reality points align with the corresponding set of reference points.

In another aspect of the present disclosure, a calibration system for calibrating an image capturing device mounted on a machine is provided. The calibration system includes an image capturing device configured to capture one or more images of a calibration target, wherein the one or more images include a set of reference points corresponding to the calibration target. The calibration system includes a display communicably coupled to the image capturing device. The display is configured to display the one or more images. The calibration system includes a processor communicably coupled to the display. The processor is configured to receive a first positional data and a second positional data associated with the image capturing device and the calibration target respectively. The process generates a set of augmented reality points based on the first positional data and the second positional data. The processor is configured to overlay the set of augmented reality points on the set of reference points displayed on the display. The processor is further configured to iteratively adjust at least one of a roll, a yaw, or a pitch of the image capturing device until the set of augmented reality points align with the corresponding set of reference points.

In yet another aspect of the present disclosure, a computer-program product for use in conjunction with an image capturing device and a display is disclosed. The image capturing device is configured to capture one or more images of a calibration target and communicably coupled to the display configured to display the one or more images. The computer-program product comprises a non-transitory computer-readable storage medium having instructions for causing a processor to receive a first positional data associated with the image capturing device and to receive a second positional data associated with a calibration target. The processor is configured to generate a set of augmented reality points based on the first positional data and the second positional data. The processor is configured to overlay the set of augmented reality points on the one or more images displayed on the display, wherein the one or more images include a set of reference points corresponding to the calibration target. The processor is further configured to iteratively adjust at least one of a roll, a yaw, or a pitch of the image capturing device until the set of augmented reality points align with the corresponding set of reference points.

DETAILED DESCRIPTION

Figure 1:
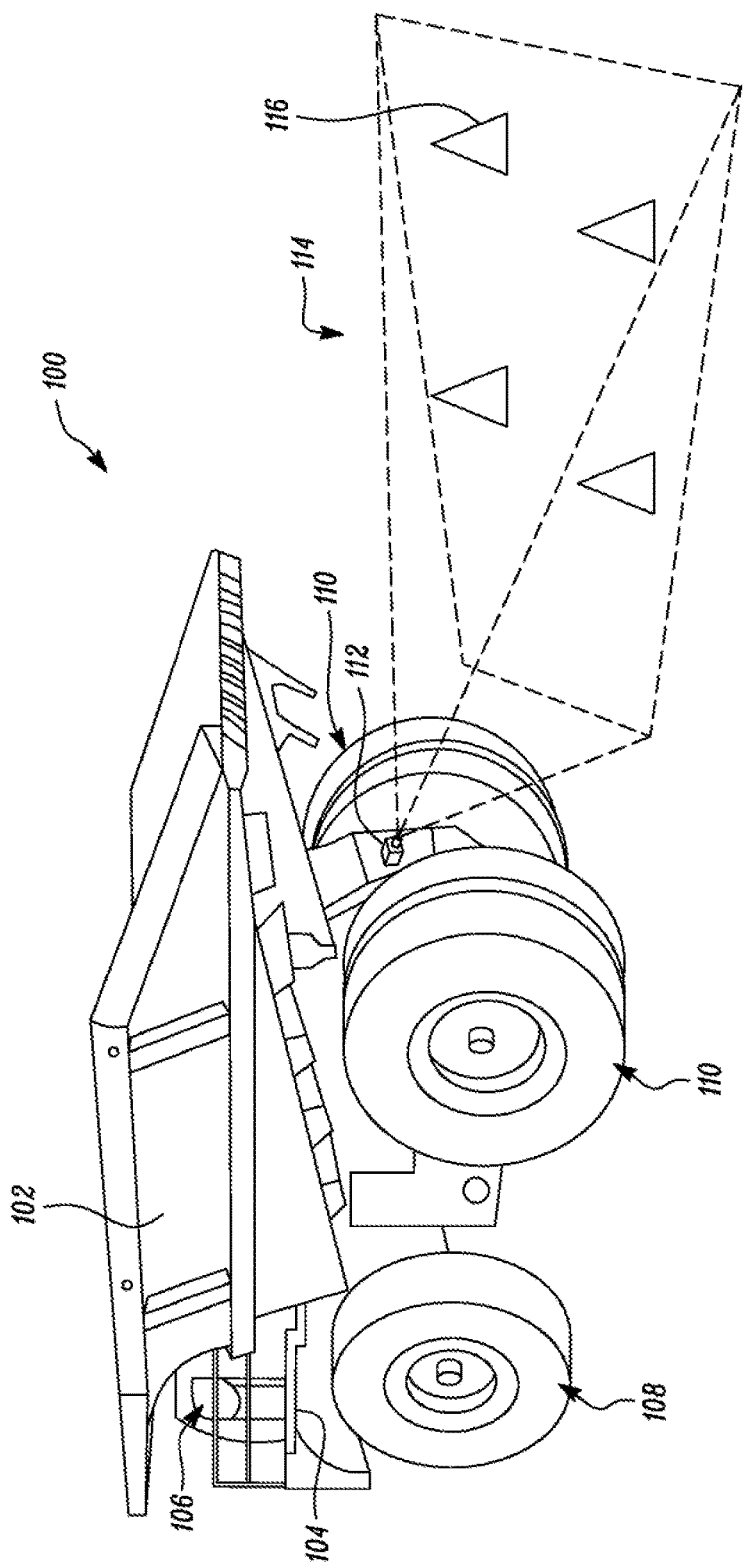
FIG. 1 shows a schematic view of a machine provided with an image capturing device, according to an aspect of the present disclosure.

Wherever possible, the same reference numbers will be used throughout the drawings to refer to same or like parts. FIG. 1 shows a schematic view of a machine 100 and example methods according to certain embodiments of the invention. Although, the machine 100 is illustrated as a dump truck in FIG. 1, the machine 100 may be any other type of a work machine, which may perform various operations associated with industries such as mining, construction, farming, transportation, landscaping, or the like. Examples of such machines may comprise a wheel loader, a hydraulic excavator, a hydraulic shovel, and a dozer.

The machine 100 includes a truck body 102 pivotably attached to a frame 104 of the machine 100. The machine 100 has an operator cabin 106 housing controls to operate the machine 100. Ground engaging elements or front and rear wheels 108, 110 are provided on the machine 100 for mobility. During operation, the truck body 102 pivots about a pair of pivot pins. The movement of truck body 102 is controlled by one or more actuators. The truck body 102 is configured to be loaded with material, and the machine 100 transports the material from one location to another for dumping. For example, the truck body 102 may be loaded with the material. After moving to the dumping location, the truck body 102 may be actuated for dumping the material.

An image capturing device 112 is mounted on the machine 100. The image capturing device 112 is configured to capture an image of an environment of the machine 100. In the illustrated embodiment, the image capturing device 112 is mounted on a rear side of the machine 100. The image capturing device 112 is configured for viewing areas behind the machine 100. In other embodiments, or with other machine types, the image capturing device 112 might be configured for viewing to the front, left side, right side, or some other direction from the machine 100. The image capturing device 112 may provide assistance functions to an operator of the machine 100 such as lane keeping, parking aid, obstacle detection, vehicle detection, and collision avoidance. In the illustrated embodiment of FIG. 1, only one image capturing device 112 is shown, however, there may be multiple image capturing devices 112 that may be mounted at different locations on the machine 100. The image capturing devices 112 may capture a 360-degree view of the environment of the machine 100.

In one embodiment, the image capturing device 112 is a monocular camera. In another embodiment, the image capturing device 112 is a stereo camera. Embodiments of the image capturing device 112 may comprise cameras that are sensitive to the visual, infrared, or any other portion of the electromagnetic spectrum. Further, the image capturing device 112 may be a camera capable of capturing both still and moving images. In another embodiment, the image capturing device 112 may comprise a smart camera or a smart vision system having a dedicated on-board processor, including video processing acceleration provided by programmable state array (FPGA), digital signal processor (DSP), general purpose graphics processing unit (GP-GPU), or any other suitable microprocessor with supporting application software.

The machine 100 may be provided with a positioning system (not shown) configured to provide a first positional data associated with the image capturing device 112. It will be apparent to a person having ordinary skill in the art that the positioning system may be a Global Navigation Satellite System, a Global Positioning System, any other Satellite Navigation System, an Inertial Navigation System, an Augmented Navigation System, any other known positioning system, or a combination thereof. In one embodiment, the first positional data includes a latitude, a longitude, and an altitude of the image capturing device 112.

Various embodiments of the present disclosure are directed towards calibration of the image capturing device 112. The calibration includes adjusting alignment parameters such as a roll, a yaw, and a pitch, and/or adjusting translational parameters such as a x-coordinate, a y-coordinate, and a z-coordinate of the image capturing device 112 until the image capturing device 112 is calibrated. For performing calibration, a calibration target 114 is placed in a field of view of the image capturing device 112. In the illustrated embodiment, the calibration target 114 includes four points 116 (marked by cones) on the ground. The image capturing device 112 captures one or more images of the calibration target 114. The image capturing device 112 may be electrically coupled to a display (not shown) mounted in the operator cabin 106 to allow the operator to view one or more captured images.

Figure 2:
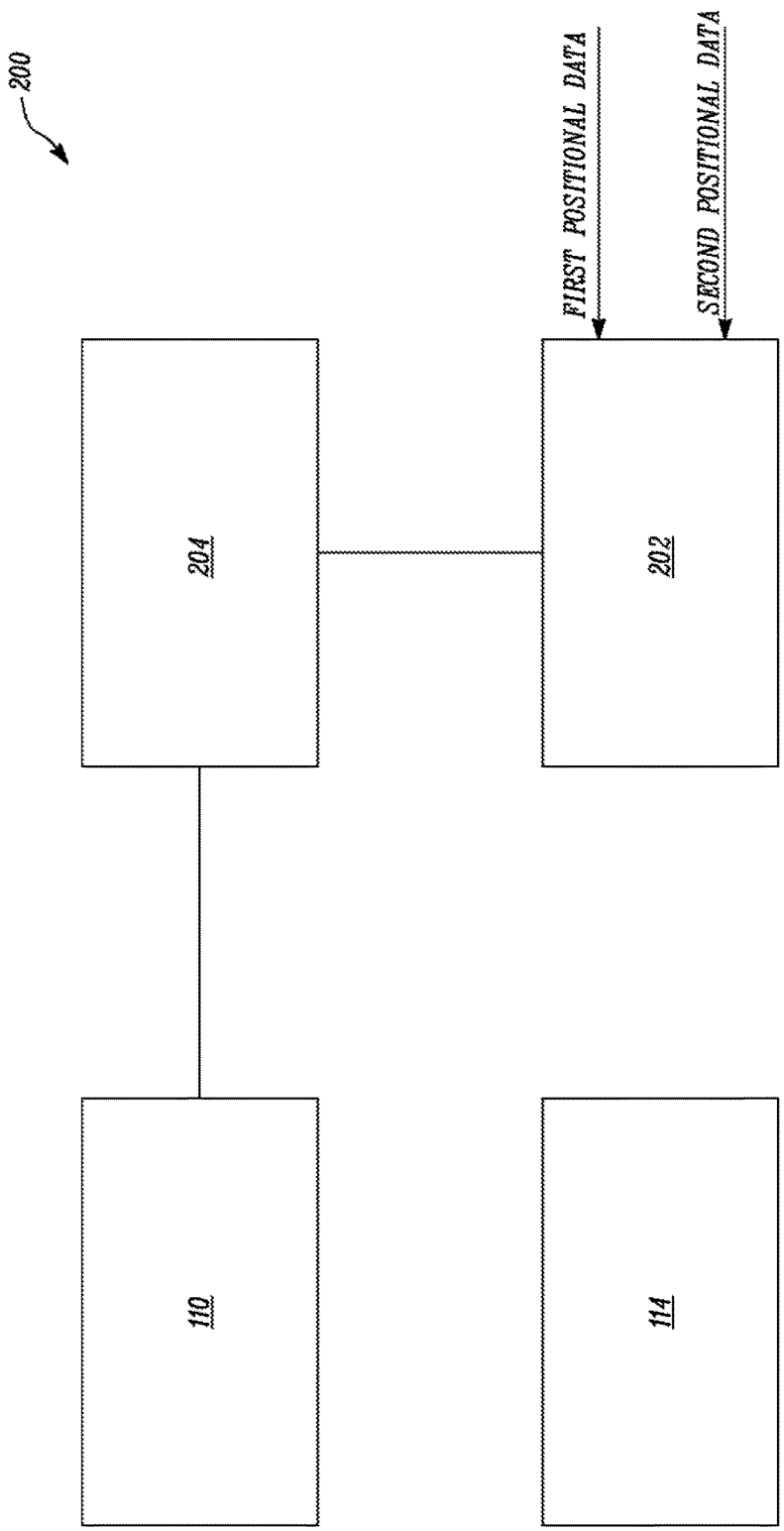
FIG. 2 illustrates a calibration system for calibrating the image capturing device, according to an aspect of the present disclosure.

FIG. 2 illustrates a calibration system 200 for calibration of the image capturing device 112 in accordance with certain embodiments of the invention. The calibration system 200 includes the calibration target 114 used for calibrating the image capturing device 112. In one embodiment, the calibration target 114 includes at least three non-collinear points on the ground. The points may be marked using objects such as cones that are easy to view in the image. In another embodiment, the calibration target 114 may be an object in the shape of a polygon, such as, triangle, rectangle, trapezium, or square. Vertices of the polygon may be considered as marked points for the calibration. In some embodiments, the calibration target 114 may be a fixed infrastructure such as a rectangular cement pad on the ground.

A second positional data associated with the calibration target 114 may be predetermined or determined during the calibration. The second positional data may be obtained using satellite-based positioning systems such as global positioning system (GPS), GLONASS, Galileo, Beidou, etc. The second positional data may include a latitude, a longitude, and/or an altitude of the calibration target 114. In some embodiments, the second positional data may include relative positional data of the calibration target 114 with respect to the machine 100. For example, the second positional data may include the linear and/or angular dimensions of the calibration target 114 and a distance of the calibration target 114 from the machine 100.

In one embodiment, the second positional data associated with the calibration target 114 is obtained by conducting survey of the marked points using real time kinematic (RTK) global navigation satellite system (GNSS) system. Alternatively, in other embodiments, the second positional data such as linear or angular dimensions of the calibration target 114 may be measured during calibration or predetermined.

Figure 3:
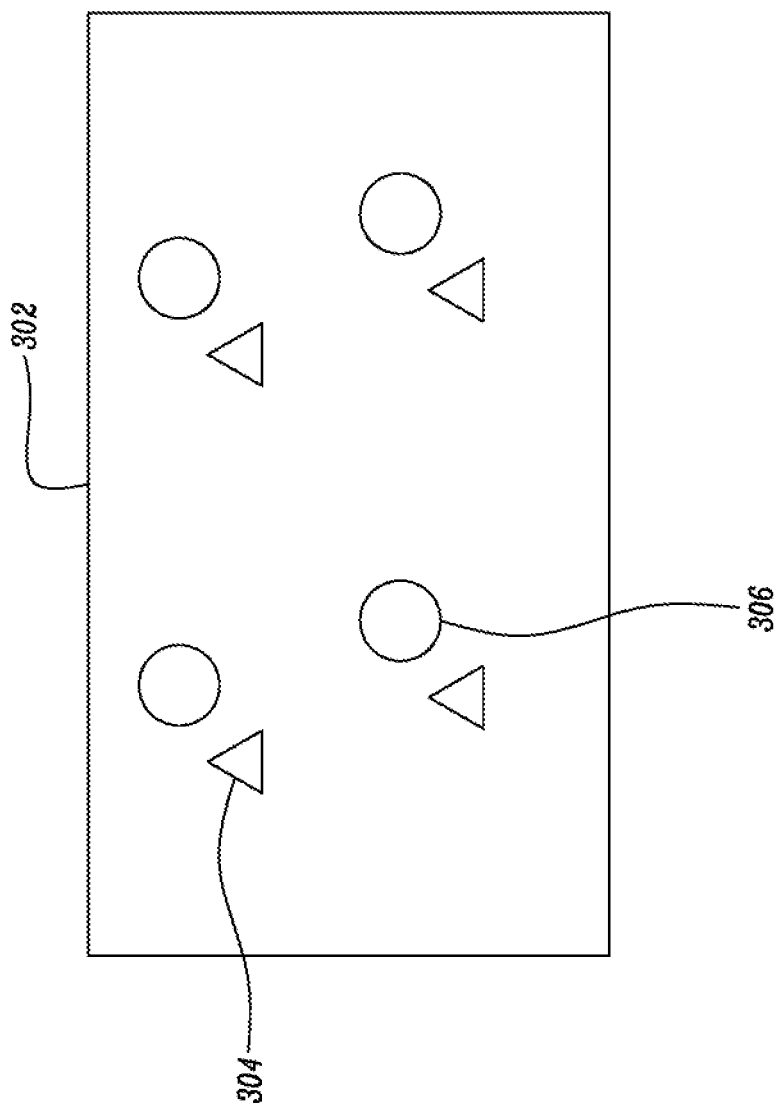
FIG. 3 illustrates an image of a calibration target displayed on a display, according to an aspect of the present disclosure.

The image capturing device 112 captures one or more images of the calibration target 114. In one embodiment, the image includes a set of reference points corresponding to the marked points of the calibration target 114. FIG. 3 illustrates an image 302 of the calibration target 114 in accordance with an example embodiment of the present invention. The image 302 includes the reference points 304 corresponding to marked points 116 of the calibration target 114.

Figure 4:
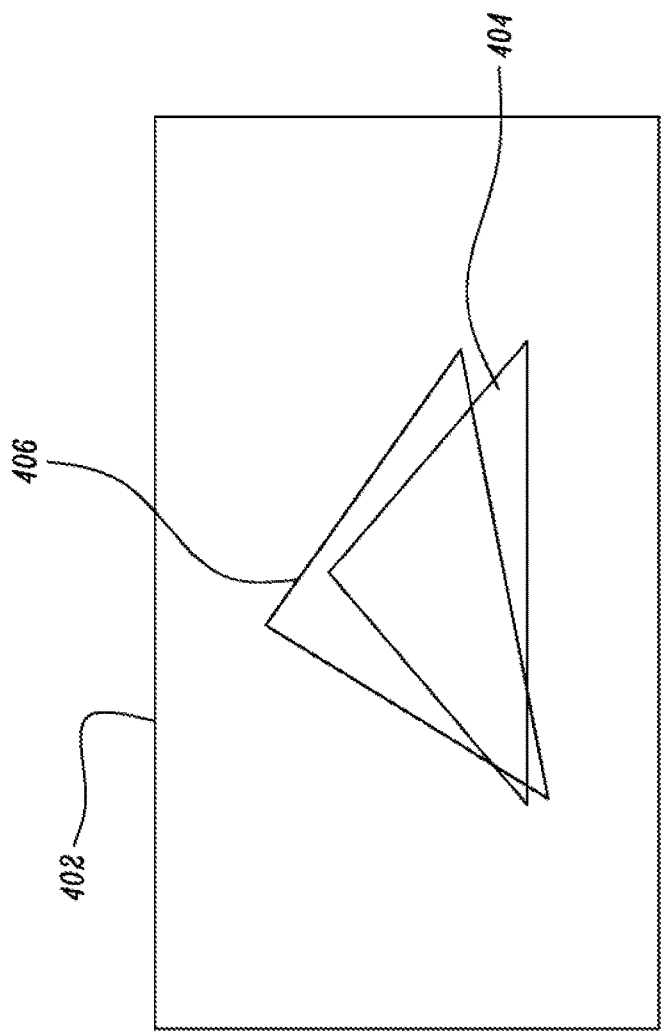
FIG. 4 illustrates an image of the calibration target displayed on the display, according to an aspect of the present disclosure.

In another embodiment, the image includes a reference object corresponding to the object of the calibration target 114. FIG. 4 illustrates an image 402 captured by the image capturing device 112 in accordance with an example embodiment of the present invention. The image 402 includes a reference object 404 corresponding to the calibration target 114 having a triangular shape.

The calibration system 200 includes a display 202 communicably coupled to the image capturing device 112. The display 202 is configured to display the images captured by the image capturing device 112. The display 202 may be provided in the operator cabin 106 to allow the operator to view the images. In one embodiment, the display 202 is a touch-screen display configured to receive touch inputs from the operator for calibration of the image capturing device 112.

The calibration system 200 further includes a processor 204 communicably coupled to the display 202. The processor 204 is configured to generate a set of augmented reality (AR) points or a AR polygon corresponding to the marked points 116 of the calibration target 114. The processor 204 receives the first positional data associated with the image capturing device 112. The processor 204 may obtain the first positional data from the positioning system of the machine 100. The processor 204 further receives the second positional data associated with the calibration target 114. The processor 204 is configured to process the first positional data and the second positional data and generate the set of AR points. Referring to FIG. 3, a set of AR points 306 are overlaid on the reference points 304 of the image 302. Similarly, in FIG. 4, a AR polygon 406 is overlaid on the reference object 404 of the image 402. The processor 204 is communicably coupled to the display 202 to allow visualization of the AR points. The processor 204 is configured to overlay the AR points on the reference points of the image of the calibration target 114.

Figure 5:
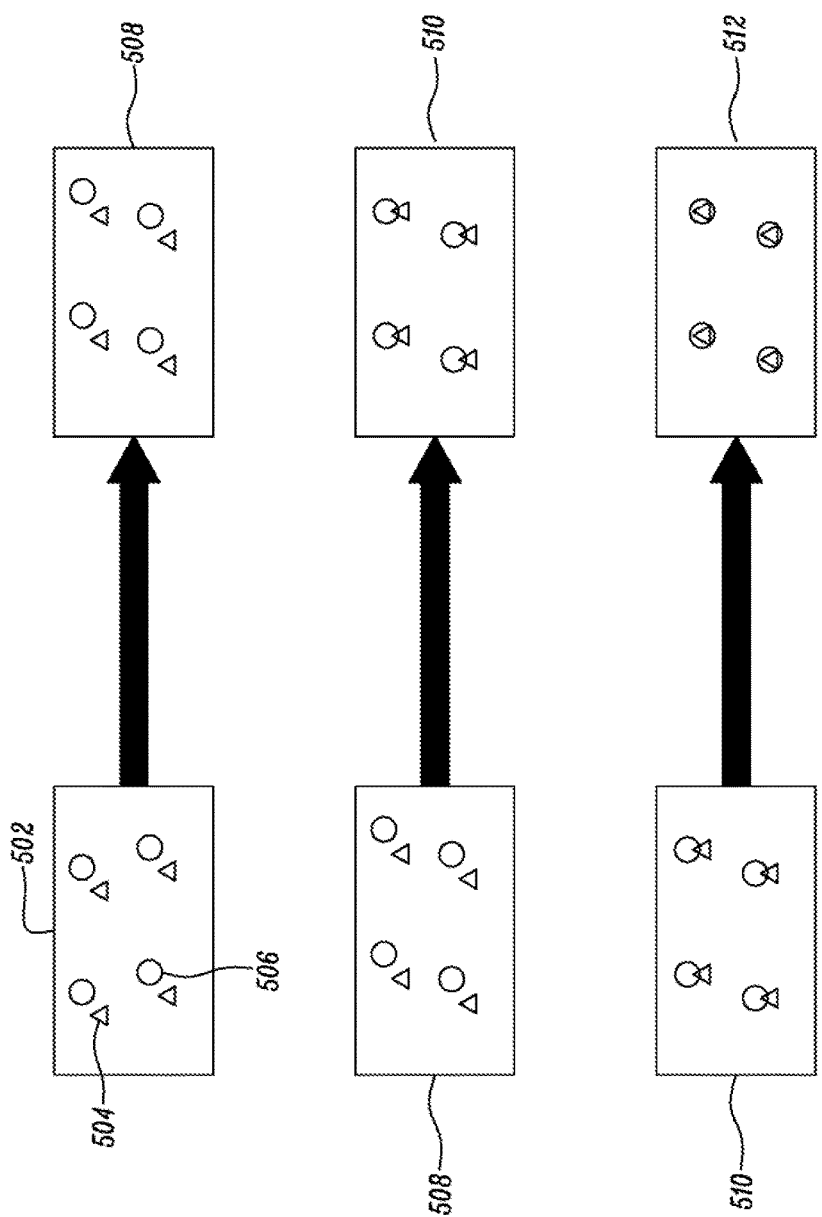
FIG. 5 illustrates images of the calibration target overlaid with the corresponding AR graphics, according to an aspect of the present disclosure.

Calibration of the image capturing device 112 involves simultaneously viewing the image of the calibration target 114 and the corresponding AR points on the display 202. FIG. 5 illustrates images of the calibration target 114 overlaid with the corresponding AR graphics in accordance with certain embodiments of the invention. Image 502 shows reference points 504 and overlaid AR points 506. Initially, the image capturing device 112 may not be calibrated. As a result, the AR points 506 may not align well with the reference points 504. The processor 204 is configured to iteratively adjust one or more alignment parameters of the image capturing device 112 to align the AR points 506 with the reference points 504. In one embodiment, the alignment parameters include the roll, the yaw, and the pitch of the image capturing device 112.

The processor 204 is configured to adjust the roll parameter of the image capturing device 112. Image 508 shows the changed position of AR points 506 after the roll parameter is adjusted by the processor 204. Subsequently, the processor 204 is configured to adjust the yaw parameter of the image capturing device 112. Image 510 shows the changed position of AR points 506 after the yaw parameter is adjusted by the processor 204. In a similar manner, the processor 204 is configured to adjust the pitch parameter of the image capturing device 112. Image 512 shows the changed position of AR points 506 after the pitch parameter is adjusted by the processor 204. The roll, the yaw, and the pitch are iteratively adjusted until the AR points 506 are aligned with the reference points 504. In one embodiment, the roll, the yaw, and the pitch are adjusted in a pre-defined order. The pre-defined order may be the roll parameter followed by the yaw parameter and subsequently the pitch parameter. The calibration is complete when the AR points 506 are aligned with the reference points 504, as shown in the image 512.

Figure 6:
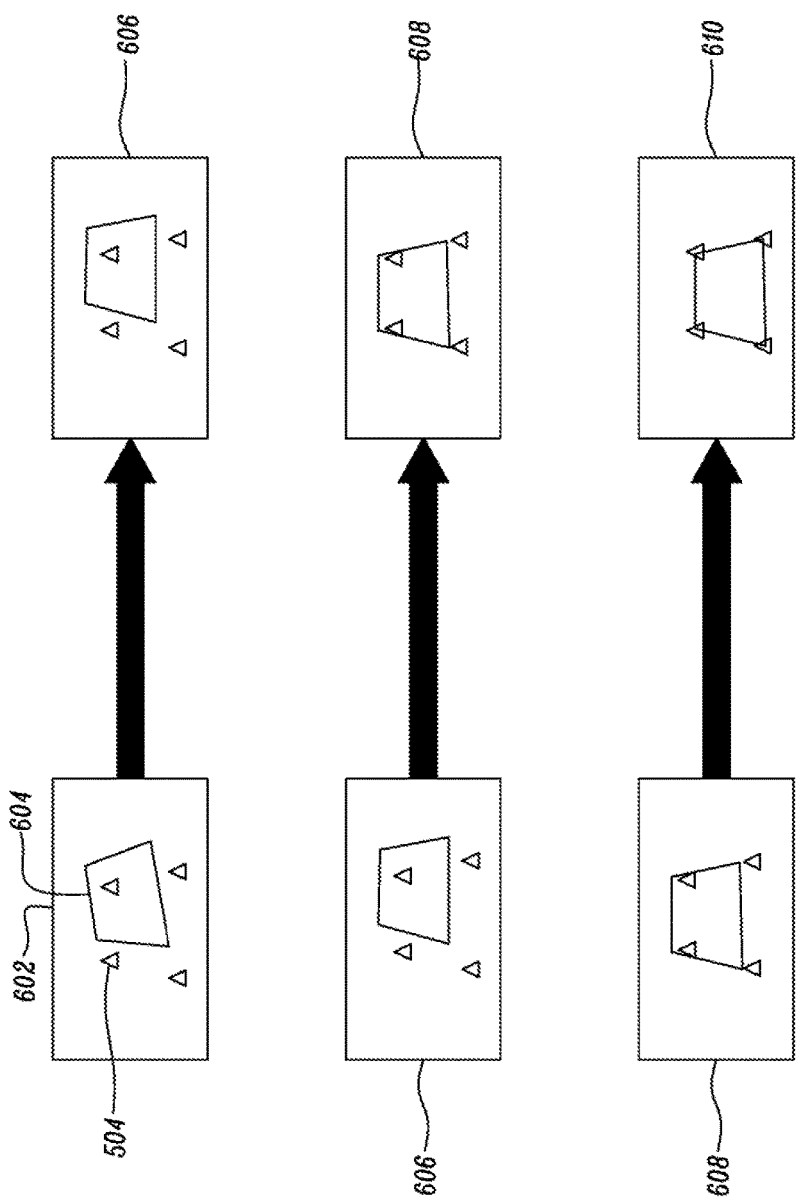
FIG. 6 illustrates images of the calibration target overlaid with the corresponding AR graphics, according to another aspect of the present disclosure.

FIG. 6 illustrates images of the calibration target 114 overlaid with the corresponding AR graphics in accordance with certain embodiments of the invention. Image 602 shows reference points 504 and overlaid AR polygon 604. Initially, vertices of the AR polygon 604 may not align well with the reference points 504 as the image capturing device 112 may not be calibrated. The processor 204 is configured to iteratively adjust one or more alignment parameters of the image capturing device 112 to align vertices of the AR polygon 604 with the reference points 504.

The processor 204 is configured to adjust the roll parameter of the image capturing device 112. Image 606 shows the changed position of AR polygon 604 after the roll parameter is adjusted by the processor 204. Subsequently, the processor 204 is configured to adjust the yaw parameter of the image capturing device 112. Image 608 shows the changed position of AR polygon 604 after the yaw parameter is adjusted by the processor 204. In a similar manner, the processor 204 is configured to adjust the pitch parameter of the image capturing device 112. Image 610 shows the changed position of AR polygon 604 after the pitch parameter is adjusted by the processor 204. The calibration is complete when vertices of the AR polygon 604 are aligned with the reference points 504, as shown in the image 610.

Figure 7:
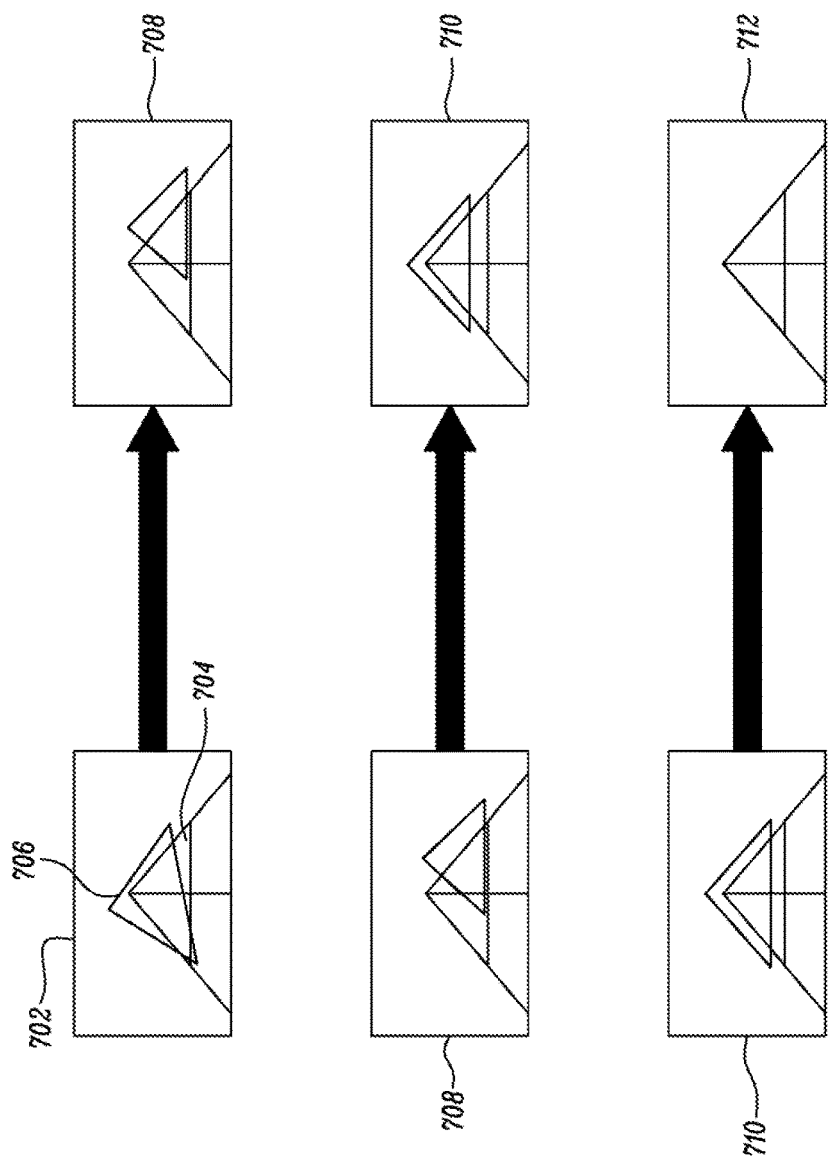
FIG. 7 illustrates images of the calibration target overlaid with the corresponding AR graphics, according to yet another aspect of the present disclosure.

FIG. 7 illustrates images of the calibration target 114 overlaid with the corresponding AR graphics in accordance with certain embodiments of the invention. Image 702 shows a reference object 704 having triangular shape and overlaid AR polygon 706. In one embodiment, the reference object 704 may be a calibration triangle formed using ropes. The linear and/or angular dimensions of the calibration triangle are predetermined. All of the three vertices of the calibration triangle are connected to appropriate anchor points (not shown) associated with the machine 100 using anchor ropes as shown in FIG. 7. When ropes are taut, the calibration triangle can self-align for calibrating the image capturing device 112 relative to the reference object 704. Initially, vertices of the AR polygon 706 may not align well with vertices of the reference object 704 as the image capturing device 112 may not be calibrated. The processor 204 is configured to iteratively adjust one or more alignment parameters of the image capturing device 112 to align the vertices of the AR polygon 706 with the vertices of the reference object 704.

The processor 204 is configured to adjust the roll parameter of the image capturing device 112. Image 708 shows the changed position of AR polygon 706 after the roll parameter is adjusted by the processor 204. Subsequently, the processor 204 is configured to adjust the yaw parameter of the image capturing device 112. Image 710 shows the changed position of AR polygon 706 after the yaw parameter is adjusted by the processor 204. In a similar manner, the processor 204 is configured to adjust the pitch parameter of the image capturing device 112. Image 712 shows the changed position of AR polygon 706 after the pitch parameter is adjusted by the processor 204. The calibration is complete when vertices of the AR polygon 706 are aligned with the vertices of the reference object 704, as shown in the image 712.

In one embodiment, the processor 204 is configured to automatically adjust the alignment parameters of the image capturing device 112 in order to align the AR graphics with the corresponding points of the calibration target 114 in the image. Alternatively, the processor 204 may be configured to receive manual inputs from the operator to adjust the roll parameter, the yaw parameter, and the pitch parameter.

The processor 204 may be further configured to iteratively adjust the translational parameters to adjust a size of the set of the AR points or a size of the AR polygon. In various embodiments, the processor 204 is configured to adjust the translational parameters such as the x-coordinate, the y-coordinate, and the z-coordinate of the image capturing device 112.

Processor 204 may be a single microprocessor or multiple microprocessors that include components for performing functions consistent with the present disclosure. Numerous commercially available microprocessors can be configured to perform the functions of processor 204 disclosed herein. It should be appreciated that processor 204 could readily be embodied in a general-purpose microprocessor capable of controlling numerous functions associated with each of the devices present in the machine 100. Processor 204 may also include a memory, a secondary storage device, and any other components for running an application. Various circuits may be associated with processor 204 such as power supply circuitry, a solenoid driver circuitry, a signal conditioning circuitry for e.g., an analog-to-digital converter circuitry, and other types of circuitry. Various routines, algorithms, and/or programs can be programmed within processor 204 for execution thereof. Moreover, it should be noted that processor 204 disclosed herein may be a stand-alone processor 204 or may be configured to co-operate with existing processors, for example, an electronic control module (ECM) (not shown) provided in the machine 100 to perform functions that are consistent with the present disclosure.

INDUSTRIAL APPLICABILITY

Example systems and methods in accordance with this disclosure may be employed in various machines so that the machines may be more easily operated.

In an example, large machines, such as dump trucks, may be equipped with one or more image capturing devices for providing an operator of the machine with a view of the environment of the machine via one or more displays provided in the operator cabin. Such image capturing devices may be used for other purposes, such as, but not limited to, parking assistance, obstacle detection, lane assistance and/or operation of the machine. By use of the disclosed example systems and methods, the image capturing devices can be calibrated with high accuracy to ensure that the operator has an accurate view of the surrounding environment, thereby allowing better overlay of augmented reality information on the image captured by the image capturing device. This allows the operator to more easily identify and/or distinguish nearby objects while operating the machine.

Figure 8:
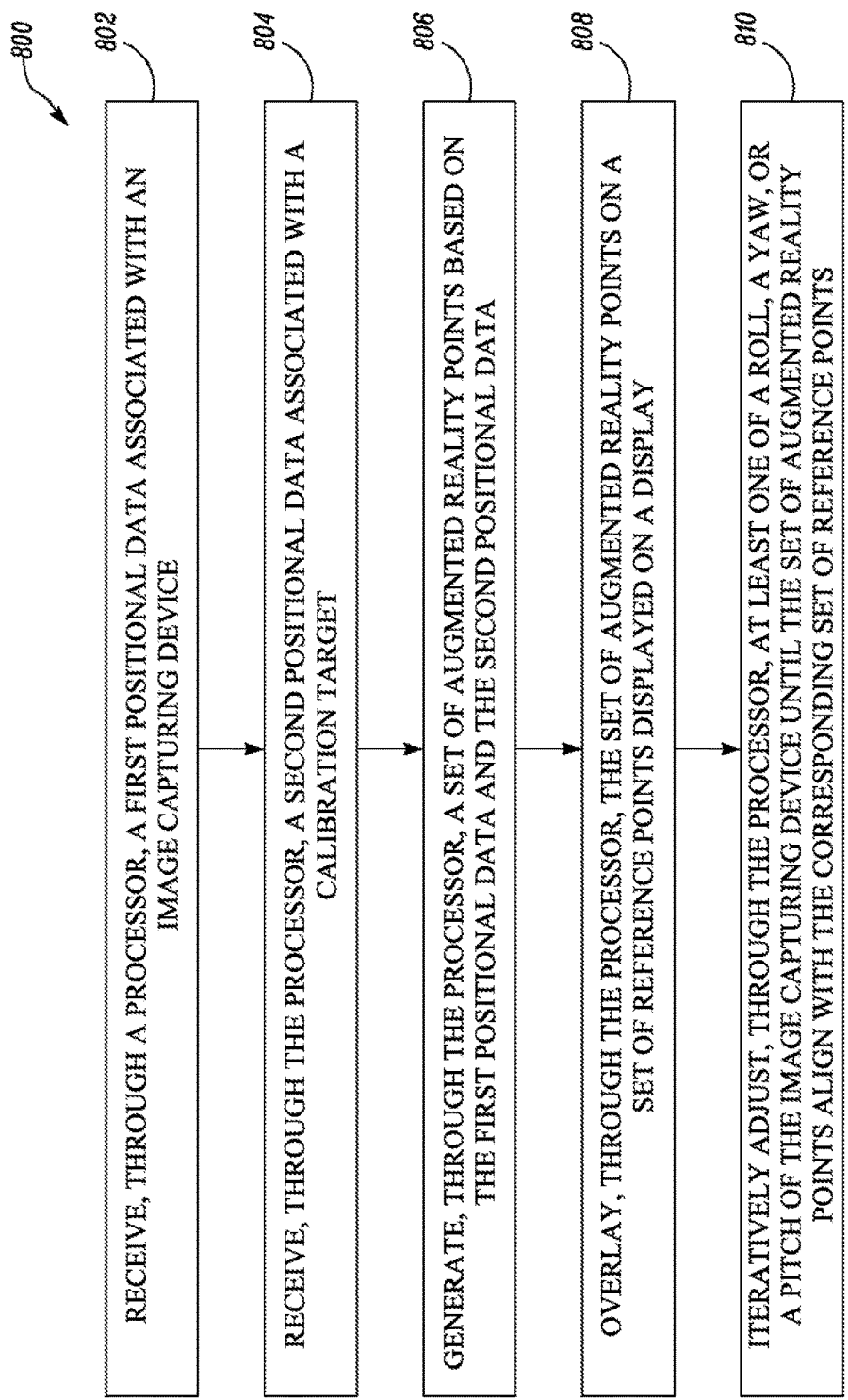
FIG. 8 is a method for calibrating the image capturing device mounted on the machine, according to an aspect of the present disclosure.

FIG. 8 is a method 800 for calibrating the image capturing device 112 mounted on the machine 100. The image capturing device 112 captures images of the calibration target 114. The image includes the set of reference points corresponding to marked points of the calibration target 114.

At block 802, the processor 204 receives the first positional data associated with the image capturing device 112. At block 804, the processor 204 receives the second positional data associated with the calibration target 114. The processor 204 processes the first positional data and the second positional data and generates the AR graphics such as the set of AR points or the AR polygon at block 806.

At block 808, the processor 204 overlays the AR graphics on the reference points displayed on the display. Initially, when the image capturing device 112 is not calibrated, the AR points do not align with the reference points. At step 810, the processor 204 is configured to iteratively adjust the alignment parameters such as the roll, the yaw, and the pitch of the image capturing device 112 until the AR points align with the reference points.

The steps of the method 800 described in connection with the aspects disclosed herein may be embodied directly in hardware, in a software module executed by a processor (e.g., of a computer), or in a combination of the two. A software module may reside, for example, in RAM memory, flash memory, ROM memory, EPROM memory, EEPROM memory, registers, hard disk, a removable disk, a CD-ROM, or any other form of storage medium. An exemplary storage medium may be coupled to the processor 204 such that the processor 204 may read information from, and write information to, the storage medium. In the alternative, the storage medium may be integral to the processor 204. The processor 204 and the storage medium may reside in an ASIC.

In at least some embodiments, a processing system (e.g., the processor 204) that implements a portion or all of one or more of the technologies described herein may include a general-purpose computer system that includes or is configured to access one or more computer-accessible media.

Figure 9:
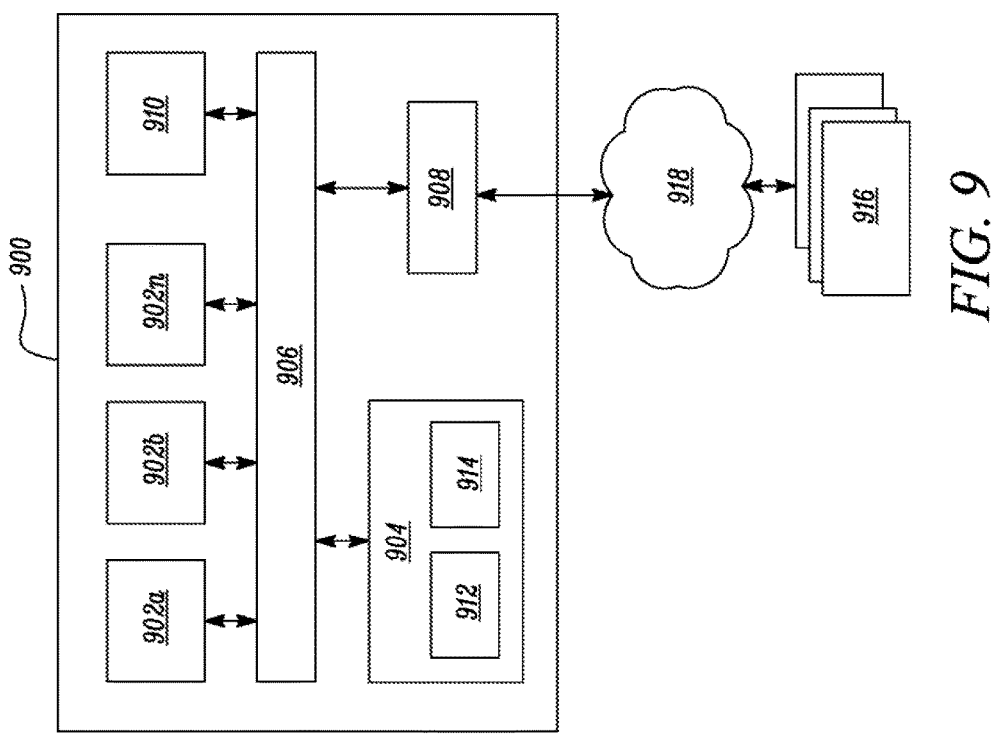
FIG. 9 illustrates a general-purpose computer system, according to an aspect of the present disclosure.

FIG. 9 depicts a general-purpose computer system that includes or is configured to access one or more computer-accessible media. In the illustrated aspect, a computing device 900 may include one or more processors 902 *a*, 902 *b*, and/or 902 *n* (which may be referred herein singularly as the processor 902 or in the plural as the processors 902) coupled to a system memory 904 via an input/output (I/O) interface 906. The computing device 900 may further include a network interface 908 coupled to the I/O interface 906.

In various aspects, the computing device 900 may be a uniprocessor system including one processor 902 or a multiprocessor system including several processors 902 (e.g., two, four, eight, or another suitable number). The processors 902 may be any suitable processors capable of executing instructions. For example, in various aspects, the processor(s) 902 may be general-purpose or embedded processors implementing any of a variety of instruction set architectures (ISAs), such as the x86, PowerPC, SPARC, or MIPS ISAs, or any other suitable ISA. In multiprocessor systems, each of the processors 902 may commonly, but not necessarily, implement the same ISA.

In some aspects, a graphics processing unit ("GPU") 910 may participate in providing graphics rendering and/or physics processing capabilities. A GPU may, for example, include a highly parallelized processor architecture specialized for graphical computations. In some aspects, the processors 902 and the GPU 910 may be implemented as one or more of the same type of device.

The system memory 904 may be configured to store instructions and data accessible by the processor(s) 902. In various aspects, the system memory 904 may be implemented using any suitable memory technology, such as static random access memory ("SRAM"), synchronous dynamic RAM ("SDRAM"), nonvolatile/Flash®-type memory, or any other type of memory. In the illustrated aspect, program instructions and data implementing one or more desired functions, such as those methods, techniques and data described above, are shown stored within the system memory 904 as code 912 and data 914.

In one aspect, the I/O interface 406 may be configured to coordinate I/O traffic between the processor(s) 902, the system memory 904 and any peripherals in the device, including a network interface 908 or other peripheral interfaces. In some aspects, the I/O interface 906 may perform any necessary protocol, timing or other data transformations to convert data signals from one component (e.g., the system memory 904) into a format suitable for use by another component (e.g., the processor 902). In some aspects, the I/O interface 906 may include support for devices attached through various types of peripheral buses, such as a variant of the Peripheral Component Interconnect (PCI) bus standard or the Universal Serial Bus (USB) standard, for example. In some aspects, the function of the I/O interface 906 may be split into two or more separate components, such as a north bridge and a south bridge, for example. Also, in some aspects some or all of the functionality of the I/O interface 906, such as an interface to the system memory 904, may be incorporated directly into the processor 902.

The network interface 908 may be configured to allow data to be exchanged between the computing device 900 and other device or devices 916 attached to a network or networks 918, such as other computer systems or devices, for example. In various aspects, the network interface 908 may support communication via any suitable wired or wireless general data networks, such as types of Ethernet networks, for example. Additionally, the network interface 908 may support communication via telecommunications/telephony networks, such as analog voice networks or digital fiber communications networks, via storage area networks, such as Fibre Channel SANs (storage area networks), or via any other suitable type of network and/or protocol.

In some aspects, the system memory 904 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media. e.g., disk or DVD/CD coupled to computing device the 900 via the I/O interface 906. A non-transitory computer-accessible storage medium may also include any volatile or non-volatile media, such as RAM (e.g., SDRAM, DDR SDRAM, RDRAM, SRAM, etc.), ROM, etc., that may be included in some aspects of the computing device 900 as the system memory 904 or another type of memory. Further, a computer-accessible medium may include transmission media or signals, such as electrical, electromagnetic or digital signals, conveyed via a communication medium, such as a network and or a wireless link, such as those that may be implemented via the network interface 908. Portions or all of multiple computing devices, such as those illustrated in FIG. 9, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for calibrating an image capturing device, the method comprising:
    receiving, by one or more processors, first positional data associated with the image capturing device,
        the image capturing device being mounted on a machine that includes ground engaging elements or wheels;
    receiving, by the one or more processors, second positional data associated with a calibration target that is in a position relative to the machine;
    generating, by the one or more processors, a set of augmented reality points, corresponding to the calibration target, based on the first positional data and the second positional data;
    overlaying, by the one or more processors, the set of augmented reality points on a set of reference points of one or more images, of the calibration target, captured by the image capturing device; and
    iteratively adjusting, by the one or more processors, at least one of a roll, a yaw, or a pitch of the image capturing device until the set of augmented reality points align with the set of reference points.

2. The method of claim 1, wherein the calibration target comprises at least three non-collinear points on a ground surface.

3. The method of claim 1, wherein the calibration target is an object of polygon shape of predetermined dimensions being placed on a ground surface at a predetermined distance from the image capturing device.

4. The method of claim 1, wherein the second positional data is obtained by a survey of the calibration target using satellite-based positioning systems.

5. The method of claim 1, wherein the set of augmented reality points are vertices of an augmented reality polygon.

6. The method of claim 1, wherein iteratively adjusting comprises adjusting the roll, the yaw, and the pitch in a predefined order.

7. The method of claim 1, wherein iteratively adjusting comprises adjusting at least one of the roll, the yaw, or the pitch based on one or more user inputs.

8. A calibration system comprising:
    an image capturing device configured to capture one or more images of a calibration target,
        wherein the image capturing device is mounted on a machine that includes ground engaging elements or wheels,
        wherein the calibration target is in a position relative to the machine, and
        wherein the one or more images include a set of reference points corresponding to the calibration target;
    and
    a processor configured to:
        receive first positional data associated with the image capturing device;
        receive second positional data associated with the calibration target;

generate a set of augmented reality points, corresponding to the calibration target, based on the first positional data and the second positional data;

overlay the set of augmented reality points on the set of reference points; and iteratively adjust at least one of a roll, a yaw, or a pitch of the image capturing device until the set of augmented reality points align with the set of reference points.

9. The calibration system of claim 8, wherein the calibration target comprises at least three non-collinear points on a ground surface.

10. The calibration system of claim 8, wherein the calibration target is an object of polygon shape of predetermined dimensions being placed on a ground surface at a predetermined distance from the image capturing device.

11. The calibration system of claim 8, wherein the second positional data is obtained by a survey of the calibration target using satellite-based positioning systems.

12. The calibration system of claim 8, wherein the set of augmented reality points are vertices of an augmented reality polygon.

13. The calibration system of claim 8, wherein the roll, the yaw, and the pitch are adjusted in a predefined order.

14. The calibration system of claim 8, wherein the roll, the yaw, and the pitch are adjusted based on one or more user inputs.

15. The calibration system of claim 8, wherein the processor is further configured to iteratively adjust a x-coordinate, a y-coordinate, and a z-coordinate of the image capturing device until the set of augmented reality points align with the set of reference points.

16. A transitory computer-readable storage medium comprising:

one or more instructions that, when executed by a processor, cause the processor to:

receive first positional data associated with an image capturing device, the image capturing device being mounted on a machine that includes ground engaging elements or wheels;

receive second positional data associated with a calibration target that is in a position relative to the machine;

generate a set of augmented reality points, corresponding to the calibration target, based on the first positional data and the second positional data;

overlay the set of augmented reality points on a set of reference points of one or more images, of the calibration target, captured by the image capturing device; and iteratively adjust at least one of a roll, a yaw, or a pitch of the image capturing device until the set of augmented reality points align with the set of reference points.

17. The non-transitory computer-readable storage medium of claim 16, wherein the image capturing device is mounted on a rear side of the machine, and wherein the image capturing device is configured for viewing areas behind the machine.

18. The non-transitory computer-readable storage medium of claim 16, wherein the first positional data is received from a positioning system of the machine.

19. The non-transitory computer-readable storage medium of claim 16, wherein the second positional data includes at least one of:

angular dimensions of the calibration target, or information identifying a distance of the calibration target to the machine.

20. The non-transitory computer-readable storage medium of claim 16, wherein the calibration target is a calibration triangle formed using ropes.

* * * * *